(12) United States Patent
Ivanov et al.

(10) Patent No.: US 9,835,462 B2
(45) Date of Patent: Dec. 5, 2017

(54) SYSTEM FOR DETERMINING A HEIGHT COORDINATE

(75) Inventors: Vladimir Ivanov, Munich (DE);
Thomas Feldbauer, Regensburg (DE);
Alexey Pryakhin, Munich (DE); Peter Kunath, Munich (DE); Marek Strassenburg-Kleciak, Garching (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 968 days.

(21) Appl. No.: 13/458,428

(22) Filed: Apr. 27, 2012

(65) Prior Publication Data

US 2012/0274633 A1 Nov. 1, 2012

(30) Foreign Application Priority Data

Apr. 29, 2011 (EP) .................................. 11 164 314

(51) Int. Cl.
| | |
|---|---|
| *G09G 5/00* | (2006.01) |
| *G06T 15/00* | (2011.01) |
| *G01C 21/32* | (2006.01) |
| *G06F 17/30* | (2006.01) |
| *G06T 17/05* | (2011.01) |
| *G06T 17/20* | (2006.01) |

(52) U.S. Cl.
CPC ....... *G01C 21/32* (2013.01); *G06F 17/30241* (2013.01); *G06F 17/30321* (2013.01); *G06T 17/05* (2013.01); *G06T 17/20* (2013.01)

(58) Field of Classification Search
CPC .... G01C 21/32; G06T 17/05; G06F 17/30321
See application file for complete search history.

(56) References Cited

U.S. PATENT DOCUMENTS

2011/0316854 A1* 12/2011 Vandrovec .................... 345/420

FOREIGN PATENT DOCUMENTS

| | | |
|---|---|---|
| JP | 2002083321 A | 3/2002 |
| JP | 2002236019 A | 8/2002 |
| JP | 2003284918 A | 10/2003 |
| JP | 2005234793 A | 9/2005 |
| JP | 2006172471 A | 6/2006 |
| JP | 2009163317 A | 7/2009 |
| WO | WO2009/143870 A1 | 12/2009 |

OTHER PUBLICATIONS

Levenberg, Joshua, "Fast view-dependent level-of-detail rendering using cached geometry." In Visualization, 2002. VIS 2002. IEEE, pp. 259-265. IEEE, 2002.*
Basu ,"Terrain Representation using Right-Triangulated Irregular Networks" CCCG 2007, Ottawa, Ontario, Aug. 20-22, 2007.*
Extended European Search Report dated Apr. 16, 2013.

* cited by examiner

*Primary Examiner* — Tapas Mazumder
(74) *Attorney, Agent, or Firm* — Artegis Law Group, LLP

(57) ABSTRACT

A navigation system has a database which stores index data for, respectively, a tile of a tiling. The index data includes, for each one of plural cells of a grid which is superimposed on the tile, respectively an identifier for each triangular face of a triangulated irregular network which at least partially overlaps with the respective cell. The plural cells of the grid are defined so as to cover the respective tile. A processing device of the navigation system is configured to use the index data to determine a triangular face on which a map feature having given lateral coordinates is located, in order to determine a height coordinate of the map feature.

22 Claims, 6 Drawing Sheets

SYSTEM FOR DETERMINING A HEIGHT COORDINATE

BACKGROUND OF THE INVENTION

1. Priority Claim

This application claims the benefit of priority from European Patent Application EP 11 164 314.4, filed Apr. 29, 2011, which is incorporated by reference 2. Technical Field This disclosure generally relates to methods and devices associated with the use of height information in navigation systems. Examples of the invention relate in particular to a navigation system, a method of determining a height coordinate and a method of generating a database. Examples of the invention relate in particular to such devices and methods which may be used for visualizing a three-dimensional terrain, including map features positioned on the terrain.

3. Related Art

Height information for a terrain may be used in navigation systems. One exemplary field in which such height information may be used is the outputting of three-dimensional maps. Optical output units may be used for outputting electronic maps. Since electronic maps may be displayed on screens of small and/or portable devices, they have the advantage of being versatile and compact. Three-dimensional (3D) maps, i.e. perspective representations, may be of particular value to the user owing to their high recognition quality. I.e., the recognition of an environmental region, such as a street intersection, may be facilitated when a three-dimensional map is output, as compared to a conventional two-dimensional representation.

Another exemplary field in which height information may be used includes navigation applications or driver assistance. For illustration, various costs functions used in route search, such as fuel consumption costs, may depend on the height difference which is to be covered. Height information allows the height differences covered upon traversal of a route to be determined. The influence of an elevation difference on fuel consumption, or on other driver assistance functions, may be taken into account.

SUMMARY OF THE INVENTION

For many of these uses of height information, the height coordinates of map features may need to be determined. For illustration, in order to correctly position a map feature such as a road segment, point of interest or area on the three-dimensional terrain, its height coordinate must be known.

One approach to ensure that map features are positioned at the correct height would be to store, for each such map feature, the height coordinate in addition to lateral coordinates in a map database. If only one height coordinate is stored for a map feature, the map feature may not be consistently displayed for the various different levels or resolutions which are typically available for displaying terrain, owing to the differences in the underlying digital elevation model (DEM) from one level to another level. Storing one height coordinate for each level is undesirable in terms of storage space.

Another approach is to use the lateral coordinates of a map feature to determine its height coordinate based on DEM data. For DEM data which have the form of triangulated irregular networks (TINs), the height coordinate can be readily computed once the triangular face is known on which the map feature having given lateral coordinates is located. However, it may be computationally costly to identify the correct triangular face, in particular for tiles which include a large number of triangular faces.

Accordingly, there is a need for a navigation system and for methods which allow performance to be increased when determining the height coordinate of a map feature based on its lateral coordinates. According to an example, a navigation system is provided. The navigation system has a database and a processing device coupled to the database. The database stores, for a plurality of tiles of a tiling, respectively index data for the respective tile and at least one triangulated irregular network, TIN, defining a three-dimensional surface. The index data includes for each one of plural cells of a grid respectively an identifier for each triangular face which at least partially overlaps with the respective cell. The plural cells of the grid are defined so as to cover the respective tile. The processing device is configured to determine a height coordinate of a map feature located on the three-dimensional surface based on lateral coordinates of the map feature. To this end, the processing device is configured to use the index data to determine a triangular face of the at least one TIN on which the map feature is located, in order to determine the height coordinate.

The database has an index structure. Using the index data, a small subset of triangular faces on which the map feature can potentially be located may be determined at low computational costs. Thereby, the computational complexity required to determine the height coordinate at run time may be reduced. According to conventional terminology in the art, "lateral coordinates" refer to the coordinates measured in orthogonal directions normal to the gravity vector. As used herein, a three-dimensional triangular face may be considered to "overlap" with a cell if the projection of the triangular face onto the tile overlaps with the cell. I.e., the height information of the triangular face may be disregarded when determining whether a triangular face overlaps with a cell. The cells may be rectangular cells, having sides aligned with the x- and y-coordinate axes of the reference frame in which the lateral coordinates of the map feature are defined.

The processing device may be configured to identify, based on the lateral coordinates of the map feature, a cell of a tile in which the map feature may be located. The processing device may be configured to determine, using the index data for the tile, a subset of triangular faces of the at least one TIN which at least partially overlap with the determined cell. Thereby, all candidate triangular faces on which the map feature could be located may be identified using the index structure.

The processing device may be configured to establish one triangular face of the subset on which the map feature may be located. To this end, the processing device may use a mathematical routine. Examples for such "included in" routines are known to the skilled person. The routine needs to be performed only on the subset of candidate triangular faces, which on average will be significantly smaller than total number of triangular faces on a tile. The processing device may be configured to compute the height coordinate of the map feature based on data defining the established triangular face.

For at least one tile of the tiling, a size of the cells may vary throughout the tile. I.e., the grid may include cells having different sizes within one tile. Thereby, different sizes of triangular faces of the TIN(s) may be accounted for. In areas of a tile where triangular faces are generally smaller, smaller cells may be used.

For all tiles of the tiling, the plural cells may respectively be defined such that a number of triangular faces which overlaps with any one of the plural cells may be limited by a pre-defined upper limit. This can be attained by a suitably selected cell size, which may be smaller in areas where there may be a greater number of triangular faces per unit area. Thereby, the maximum number of candidate triangular faces returned when the index data are queried may be limited.

The navigation system may comprise an optical output unit. The processing device may be coupled to the optical output unit and may be configured to control the optical output unit to output the map feature at a height corresponding to the determined height coordinate.

If a map feature is extended in the sense that it has plural pairs of lateral coordinates, plural triangular faces may respectively be determined using the index structure.

The map feature may be a road segment, a point of interest, an area, or any other feature which may be positioned on a three-dimensional terrain. According to another example, a database may be provided. The database stores, for a plurality of tiles of a tiling, respectively index data for the respective tile and at least one triangulated irregular network, TIN, defining a three-dimensional surface. The index data includes for each one of plural cells of a grid respectively an identifier for each triangular face which at least partially overlaps with the respective cell. The plural cells of the grid are defined so as to cover the respective tile.

According to another example, a method of determining a height coordinate of a map feature based on lateral coordinates may be provided. A database may be used to determine the height coordinate. The database stores, for a plurality of tiles of a tiling, respectively index data for the respective tile and at least one triangulated irregular network, TIN, defining a three-dimensional surface. The index data include for each one of plural cells of a grid respectively an identifier for each triangular face which at least partially overlaps with the respective cell. In the method, the index data may be accessed to establish, based on the lateral coordinates, a triangular face of the at least one TIN on which the map feature may be located. The height coordinate of the map feature may be determined based on the lateral coordinates and data defining the established triangular face. Examples of the method of determining a height coordinate may correspond to examples of the navigation system, having corresponding effects.

According to another example, a method of generating a database for a navigation system device may be provided. The method comprises the following steps which respectively performed for a tile of a tiling: Data defining at least one triangulated irregular network, TIN, are retrieved. The at least one TIN represents a three-dimensional surface. A grid having a plurality of cells may be defined for the tile, such that the plurality of cells covers the tile. For each cell of the grid, all triangular faces of the TIN which at least partially overlap with the respective cell are determined. Index data for the tile and the data defining the at least one TIN are stored in the database. The index data include, for each cell of the plurality of cells, information on all triangular faces of the TIN which at least partially overlap with the respective cell.

Using this method, a database may be generated which has index data. The index data facilitate the process of identifying the triangular face on which a map feature may be located, when a query may be performed using the lateral coordinates of the map feature. The plurality of cells may be defined such that a size of the cells varies throughout the grid. Thereby, different densities of triangular faces may be accounted for.

A size of the cells of the grid may be selected locally such that a number of triangular faces of the TIN which at least partially overlap with a cell may be limited by a pre-defined upper limit. Thereby, the number of candidate triangular faces identified in a query using the index structure may be kept to below the pre-defined upper limit. A limit on the number of cells in the grid, or a maximum size of each cell, may be selected based on a resolution level of the data defining the at least one TIN. Different resolution levels typically give rise to different numbers of triangular faces. This can be taken into account as constraint when defining the grid. The grid may be defined such that each one of the cells may be rectangular and sides of each cell are parallel to or overlap with sides of the tile. The database having the index structure may be deployed to a navigation system. When the database is used for determining a height coordinate, it may be used in various fields of applications, such as visualization of three-dimensional terrain on which the map feature may be positioned, computation of costs incurred upon traversal of a route, route search, or similar.

It is to be understood that the features mentioned above and those to be explained below can be used not only in the respective combinations indicated, but also in other combinations or in isolation. Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The foregoing and other features of examples will become more apparent from the following detailed description of examples when read in conjunction with the accompanying drawings. In the drawings, like reference numerals refer to like elements.

DETAILED DESCRIPTION EXAMPLES

Figure 1:
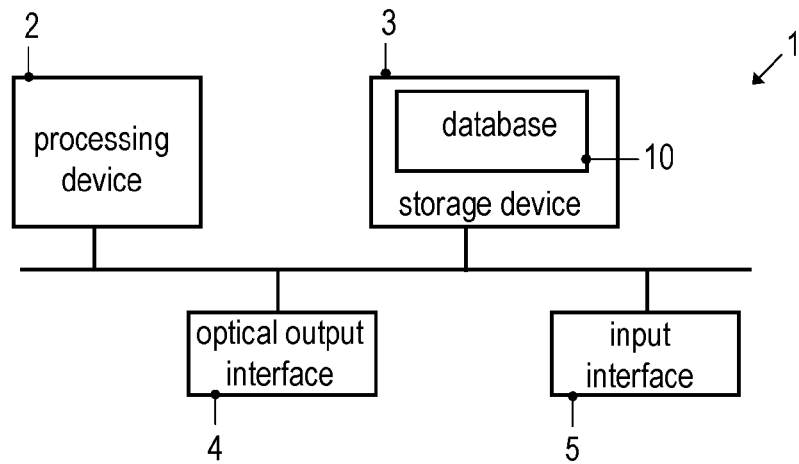
FIG. 1 is a schematic block diagram of a navigation system.

FIG. 1 schematically illustrates a navigation system 1 according to an example. The navigation system 1 comprises a processing device 2 controlling the operation of the navigation system 1. The processing device 2 may comprise a central processing unit, for example in form of one or more microprocessors, digital signal processors or application-specific integrated circuits. The processing device 2 may also include a graphics processor. The navigation system 1 further includes a database 10 stored in a storage device 3. The storage device 3 may comprise any one, or any combination, of various types of memory, such as random access memory, flash memory or a hard drive, but also removable memories such as a compact disk (CD), a DVD, a memory card or the like. The navigation system 1 also includes an optical output unit 4. The navigation system 1 may include additional components, such as a position sensor and/or a wireless receiver and/or an input interface 5.

The storage device 3 stores a database 10 which defines a three-dimensional terrain. The data in the database 10 may be used by the processing device 2 to generate three-dimensional maps, i.e., to visualize the terrain, to determine fuel consumption or other costs associated with routes, or similar.

As will be explained in more detail in the following, the data in the database 10 may be organized in accordance with a tiling. The region for which the data representing the three-dimensional terrain is to be stored may be subdivided into a plurality of tiles. For each one of the tiles, digital elevation model (DEM) data are stored. The DEM data may include one or more than one triangulated irregular networks (TINs). Each triangular face of a TIN may be located in only one tile. For a map feature having given lateral (i.e., x- and y-) coordinates located in a given tile, the triangular faces of all TINs defined for this tile are potential candidates on which the map feature could be located. In order to enhance performance in the process of identifying the one triangular face on which a map feature having the given lateral coordinates may be located, the database 10 also stores index data for each tile.

The index data associates subsets of triangular faces with given areas, referred to as cells, defined on the tile. The cells may be defined such that all cells in combination completely cover the tile for which they are defined. Boundaries of the cells may be grid lines of a grid, the grid lines extending parallel to or coinciding with sides of the tile.

Each one of the cells may be rectangular, with sides of the cell being parallel to or coinciding with a side of the tile. For such cells, the cell within which a given pair of lateral coordinates is located can be established at low computational costs.

The index data includes, for each one of the plural cells defined for the tile, information on all triangular faces of the TIN or TINs which at least partially overlap with the cell. When the cell is known in which a map feature having given lateral coordinates is located, a small sub-set of candidate triangular faces may be readily retrieved based on the index data. The map feature must be located on one of the triangular faces in the subset which, according to the index data, at least partially overlaps with the cell. It is not required to perform a routine to determine whether the map features is located on a given triangular face a number of times which, on average, scales with the number of triangular faces of the TINS for the tile.

Figure 2:
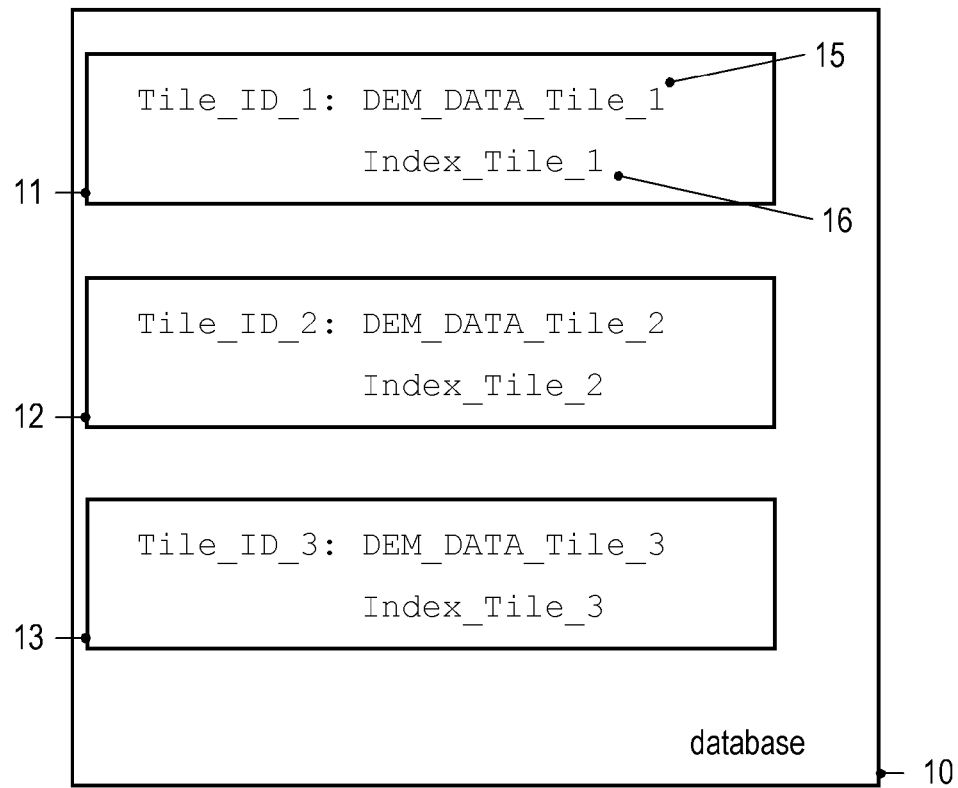
FIG. 2 is a schematic representation of a database.

FIG. 2 is a schematic view of a database 10. The database 10 may be used in the navigation system 1. The database 10 represents a three-dimensional terrain. If it is desired to provide plural different resolution levels, data structures as explained in the following may be provided for each one of the resolution levels.

The database 10 includes data 11 associated with a first tile of a tiling, data 12 associated with a second tile of the tiling, data 13 associated with a third tile of the tiling, etc. The data 11-13 for different tiles may have the same basic structure. Only the structure of data 11 will exemplarily be explained in more detail. The data 11 includes DEM data 15. The DEM data 15 may define one TIN or several TINS. For rectangular tiles, an even number of TINS may be defined.

There may be separate TINS for different zoom levels. For illustration for each tile, two TINS may be defined for a coarse zoom level, and four TINS may be defined for a finer zoom level.

The data respectively representing a TIN may include an array of 3-tuples representing the three coordinates of each vertex of the TIN. Other representations may also be used, such as using template patterns which obviate the need to separately store coordinates of all vertices for each tile. The data respectively representing a TIN may also include an index array with indices referencing vertices of the vertex array. The index array may define, for each of the triangular faces, the three vertices that form the corners of the respective triangular face. Various techniques known in the art may be used to store the TIN in a compact form. The data 11 also includes index data 16. The index data 16 include, for each cell of a grid defined on the tile, information on the triangular faces of the TIN(s) which overlap with the respective cell. For illustration, suitable identifiers for triangular faces, such as indices for triangular faces, may be included in the index data 16 in association with each cell.

As illustrated in FIG. 2, the index data may be stored in a per-tile fashion and may be combined into one larger data structure with other data, such as the DEM data, for the respective tile. Updates in response to local changes of a terrain may thus be performed more readily. The updates may be performed as over-the-air updates, as only the tile in which a change is required has to be replaced.

Figure 3:
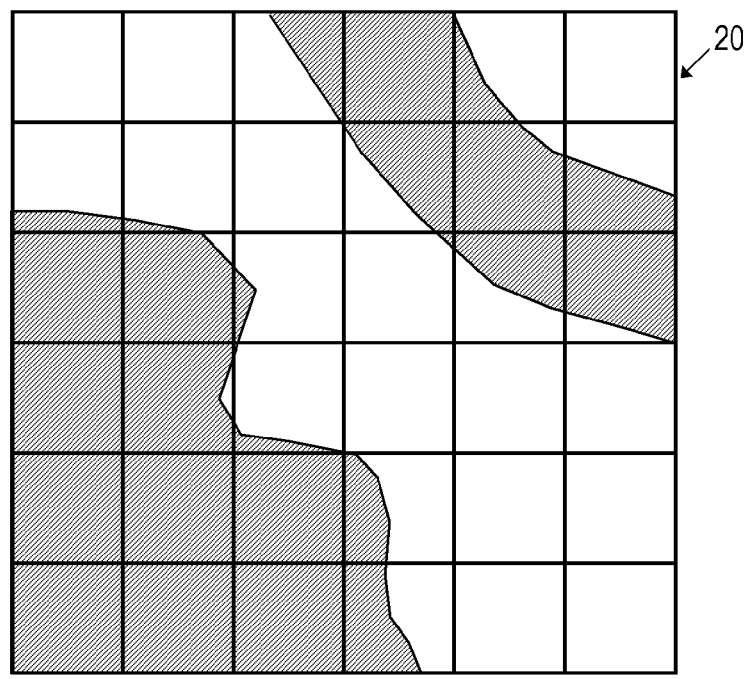
FIG. 3 is a plan view of a terrain with a superimposed tiling.

FIG. 3 is a schematic plan view of a terrain for which a tiling 20 is defined. The terrain may extend over various elevation levels, as schematically indicated by shaded areas. Shaded areas may be at one elevation level, such as sea level, while non-shaded areas may be at another elevation level. The three-dimensional surface structure of the terrain may, at least to a good approximation, be represented by the TIN(s) defined for each tile. TINs show good performance when rendering the surface structure at run time.

Figure 4:
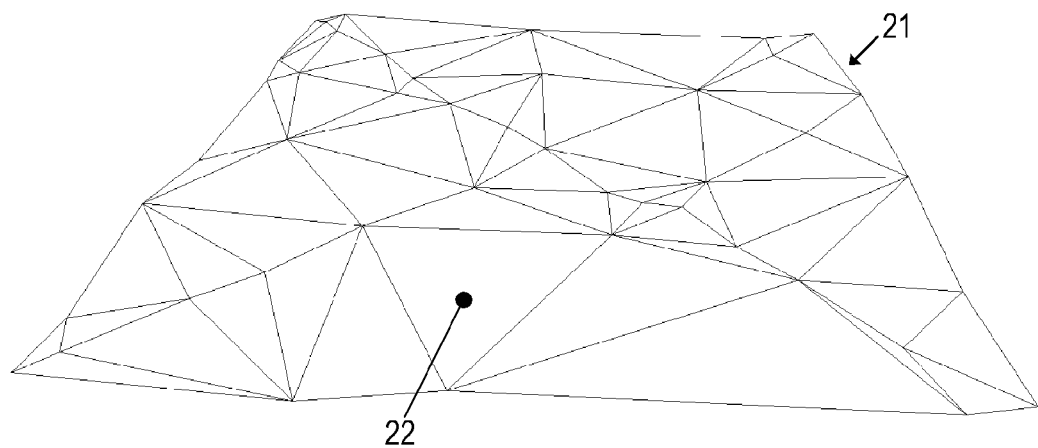
FIG. 4 is a perspective view illustrating the TIN for a tile.

FIG. 4 is a schematic perspective view illustrating the TIN 21 defined on a tile. The TIN includes a plurality of triangular faces. In order to determine the height coordinate of a map feature 22, the triangular face on which it is located must be known. When the triangular face is known, the height coordinate may be computed based on the lateral coordinates of the map feature and based on the data which define the respective triangular face. This may be done by computing a projection onto the triangular face. The index data are used to enhance performance in identifying the triangular face on which the map feature is located.

Figure 5:
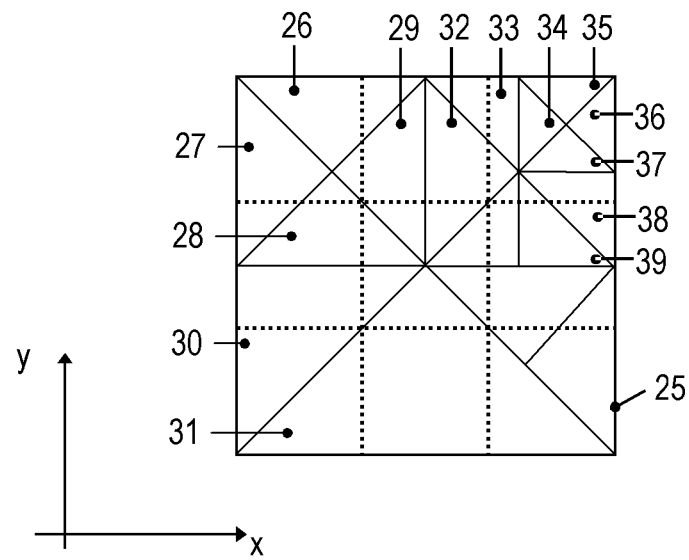
FIG. 5 is a plan view showing a tile with superimposed grid.
Figure 6:
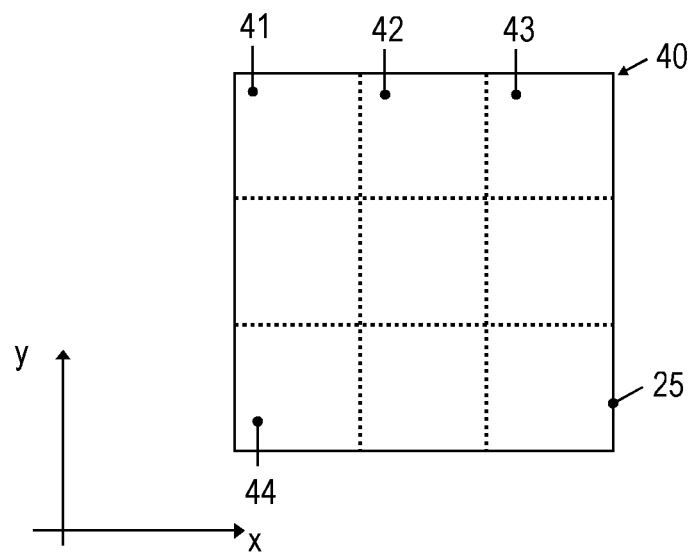
FIG. 6 is a plan view of the tile showing the superimposed grid.

FIG. 5 is a plan view of a tile 25. The topology of the TIN is shown by solid lines. A grid with grid lines shown as broken lines is superimposed on the tile 25. FIG. 6 is a plan view showing the grid 40 of FIG. 5 and cells 41-44 of the grid, with the TIN topology omitted for clarity. The TIN includes a plurality of triangular faces 26-39, shown in plan view in FIG. 5. The triangular faces may respectively overlap, when projected into the x-y-plane, with one or several of the cells 41-44 of the grid 40.

The index data provides information on the triangular faces which overlap with the various cells 41-44. For illustration, triangular faces 26-29 overlap with cell 41. The index data will correspondingly define that the triangular faces 26-29 overlap with cell 41. Triangular faces 30 and 31 overlap with cell 44. Triangular faces 26, 29, 32 and 33 overlap with cell 42. Triangular faces 32-39 overlap with cell 43.

This information may be determined in a pre-processing phase in which the database is generated. The information on which triangular faces overlap with the various cells of the grid is stored in the database as index data for subsequent use, before the database is deployed to a navigation system. When determining the triangular face on which a map feature is located, the index data may be utilized. For illustration, if the map feature is located in cell 44 (which can be easily determined based on the lateral coordinates of the map feature), the map feature must be located on one of the two triangular faces 30 and 31. Only these two faces 30 and 31 must be tested using conventional routines to determine whether the map feature is located on triangular face 30 or on triangular face 31.

While a regular grid 40 is illustrated in FIG. 6, the grid may also be defined such that the cells have varying sizes across the tile. The cell size may be selected to be smaller in areas where the number of triangular faces per unit area is greater. For illustration, a smaller cell size may be selected in the area where triangular faces 34-37 are defined.

Figure 7:
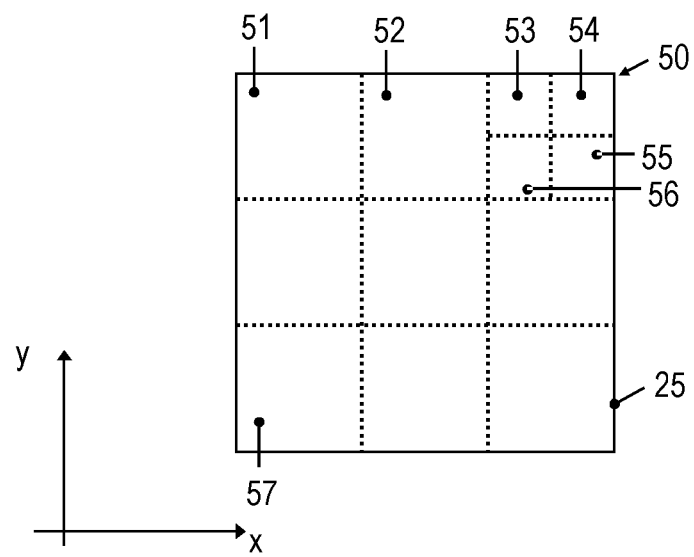
FIG. 7 is a plan view of the tile showing another superimposed grid.

FIG. 7 illustrates a grid 50 having varying cell size. Cells 51, 52 and 57 have a first size. Cells 54-56 have a second size, the area of cells 54-56 being respectively one quarter of the area of cells 51, 52 and 57. When the grid 50 is overlaid on the tile 25, only triangular faces 34 and 35 overlap with cell 53. Only triangular faces 35 and 36 overlap with cell 54. Only triangular faces 36 and 37 overlap with cell 55. And only triangular faces 37 and 34 overlap with cell 56.

The cell size may be adjusted systematically as a function of cell location, in dependence on the density of triangular faces at the respective locations. For illustration, a cell of a regular grid may be split into plural cells if it is determined that the number of triangular faces overlapping with the original cell reaches or exceeds a given upper limit. The maximum number of candidate triangular faces may thus be set to a given value.

When determining the triangular face on which a map feature is located, the index data may be utilized. For illustration, if the map feature is located in cell 54 of grid 50 (which can be easily determined based on the lateral coordinates of the map feature), the map feature must be located on one of the two triangular faces 35 and 36. Only these two faces 35 and 36 must be tested using conventional routines to determine whether the map feature is located on triangular face 35 or on triangular face 36.

For a grid as illustrated in FIG. 7, an additional data structure may be included in the data defining the DEM for the tile. The additional data structure may include information on the sizes and positions of the different cells. Rather than only splitting the cell in the right upper corner, the grid line spacing may be adjusted. Thereby, the grid line spacing may be adapted.

Figure 8:
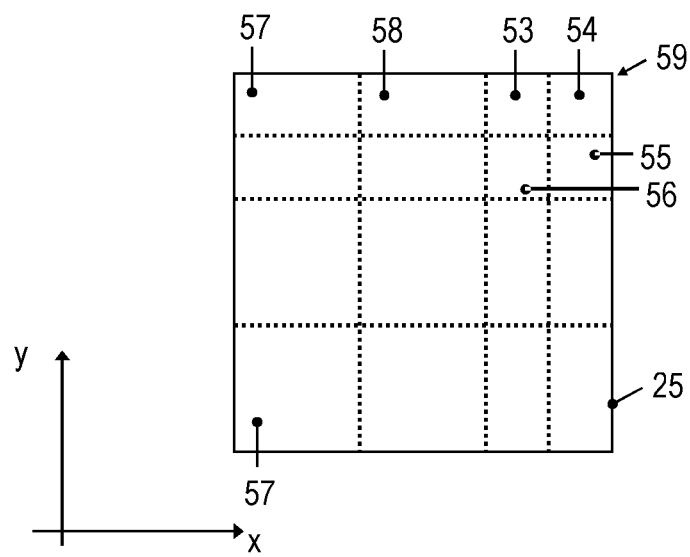
FIG. 8 is a plan view of the tile showing another superimposed grid.

FIG. 8 illustrates another grid 59 having varying cell size. In the grid 59, the grid line spacing varies. Cell 57 has a first size. Cells 57 and 58 are rectangular and not square and have a second size, the area of cells 57 and 58 being respectively one half of the area of cell 57. Cells 53-56 have still smaller area.

Information on the grid line spacing may be stored in the data which define the DEM. In particular, if the grid line spacing is non-equidistant, information on the positions of grid lines which are parallel to the x- and y-axes may be stored. This information may be utilized to determine, in a simple look-up operation, in which cell a map feature having a given pair of lateral coordinates is located.

Figure 9:
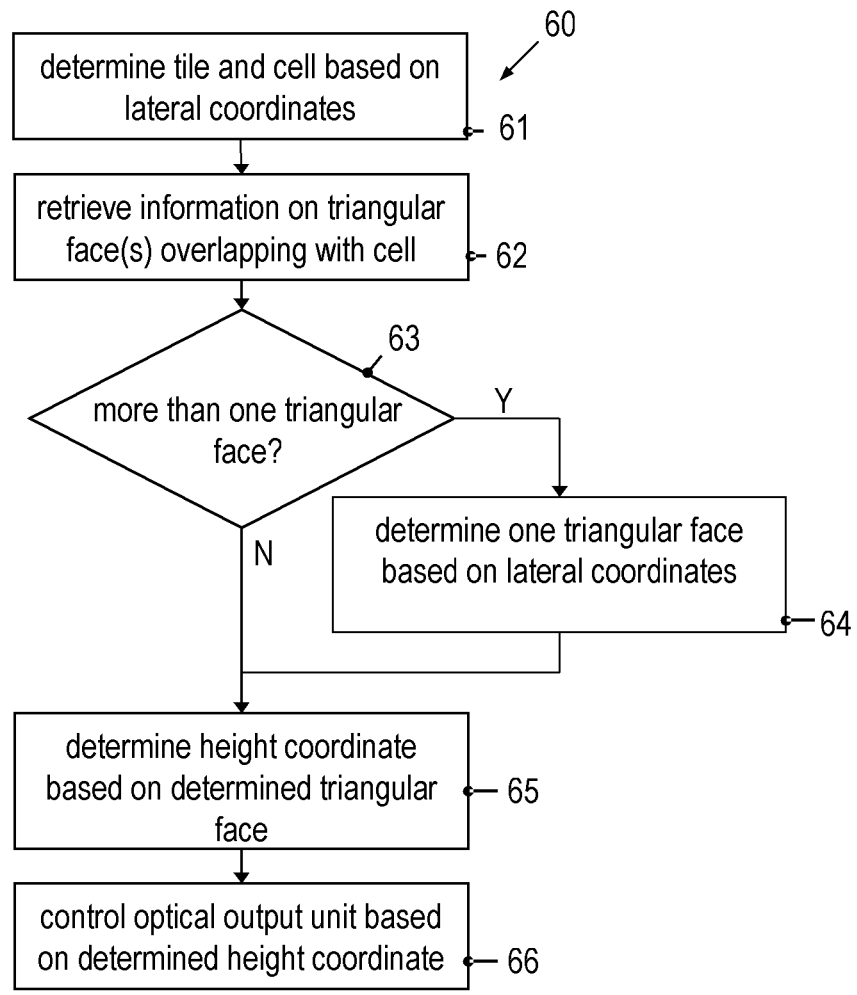
FIG. 9 is a flow chart of a method of determining a height coordinate.

FIG. 9 is a flow chart of a method 60 of determining a height coordinate of a map feature based on its lateral coordinates. The method 60 may be performed by a processing device of a navigation system. At 61, the tile and the cell of the tile in which the map feature is located are determined. This can be done at low computational cost, as the maximum and minimum x- and y-coordinates covered by each tile and by each cell in the tile are known. Information on the locations of grid lines may be retrieved from the database to determine the cell in which the map feature is located. The information may be retrieved at least if the grid line spacing of the grid defining the cells is non-equidistant.

At 62, information on the triangular face(s) overlapping with the determined cell is retrieved. The index data for the tile is used to determine which triangular face(s) overlap with the respective cell. The map feature must be located on one of the triangular face(s).

At 63, it is determined whether more than one triangular face overlaps with the cell. If more than one triangular face overlaps with the cell, the method proceeds to 64, otherwise the method proceeds to 65. At 64, one triangular face on which the map feature is located is selected from the plural triangular faces overlapping with the cell. To this end, a routine may be performed for each one of the triangular faces overlapping with the cell to determine whether the map feature with the lateral coordinates is located on the respective triangular face. While this determination is computationally more costly than steps 61 or 62, it must be performed only for the triangular faces which overlap with the cell. The method proceeds to 65.

At 65, one triangular face on which the map feature is located has been determined. Data defining the triangular face in space are used to computationally determine the height coordinate of the map feature. To this end, the intersection of the triangular face with a straight line having the x- and y-coordinates of the map feature and parallel to the height coordinate axis may be computed.

At 66, the determined height coordinate may be used in the navigation system. For illustration, an optical output unit may be controlled such that the map feature is displayed at a height which corresponds to the determined height coordinate.

Figure 10:
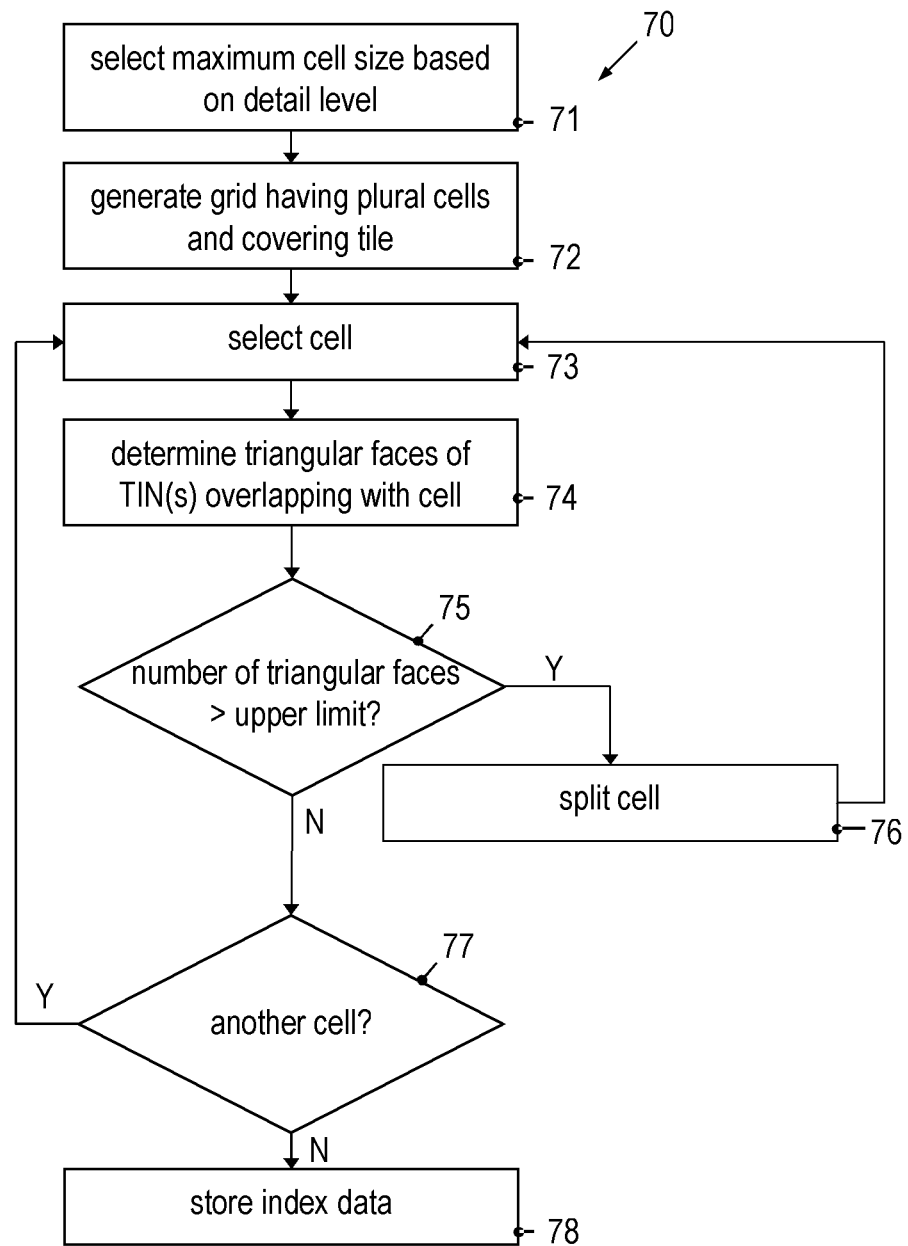
FIG. 10 is a flow chart of a method of generating a database.

FIG. 10 is a flow chart of a method of generating a database having index data. The method, which may be performed sequentially for various different tiles of a tiling, uses a grid superimposed onto the respective tile to generate the index data. The method is performed by an electronic device, such as a computer. At 71, a maximum cell size of cells of the grid may be selected based on the detail level. For different layers, or levels of detail, the tiling and TINs may be different. Accordingly, a characteristic cell size may be selected based on the respective level of detail.

At 72, a grid may be generated which has plural cells. The plural cells in combination completely cover the tile. The grid may initially be generated as a regular grid, with each tile having a size less than the maximum size determined at 71. At 73, a cell of the grid may be selected. The cell may be any arbitrary cell of the grid, with an iteration being performed over the cells in steps 73-77. At 74, all triangular faces of the TIN(s) of the tile which at least partially overlap with the cell are determined. While this may be computationally costly, step 74 is performed in a pre-processing phase in which the database is generated. Run time performance is not negatively affected thereby.

At 75, it is determined whether the number of triangular faces which at least partially overlap the cell is greater than a pre-defined upper limit. If it is determined that the number of triangular faces which at least partially overlap the cell is greater than the pre-defined upper limit, the method continues at 76. At 76, the cell may be split into plural smaller cells, each of the smaller cells having sides parallel to sides of the tile. The method then returns to 73, where one of the smaller cells may be selected.

If it is determined that the number of triangular faces which at least partially overlap the cell is not greater than the pre-defined upper limit, the method continues at 77. At 77, it is determined whether steps 73-77 have already been performed for all cells. If there is another cell for which the triangular faces overlapping with the cell have not yet been determined, the method returns to 73. A new cell is selected and steps 73-77 are repeated.

If, at 77, it is determined that steps 73-77 have already been performed for all cells, the method continues at 78. At 78, index data which include information on which triangular faces overlap with the various cells of the grid are stored in the database.

While not shown in FIG. 10, information on the positions of grid lines may also be stored in the data for the respective tile. For illustration, y-coordinates of grid lines which extend parallel to the x-axis may be stored, and x-coordinates of grid lines which extend parallel to the y-axis may be stored. The positions of grid lines may be stored selectively if the grid line spacing is non-equidistant. When the method 70 has been performed for all tiles of the tiling, the database may be deployed to a navigation system for use in determining height coordinates of map features.

While methods and a device according to examples have been described in detail, modifications may be implemented in other examples. For illustration, while a grid with square cells has been illustrated, the cells of the grid may also have other suitable shapes, such as rectangular shapes which are not squares. For further illustration, tiles of a tiling may have varying sizes and/or shapes.

Examples of the invention may be used, for example, for visualizing three-dimensional terrain with map features positioned on the terrain, for route search or other driver assistance applications, without being limited thereto.

The invention claimed is:

1. A navigation system, comprising:
    a database storing, for a plurality of tiles of a tiling, index data for a respective tile and at least one triangulated irregular network (TIN) defining a three-dimensional surface,
    where the index data:
        includes a plurality of identifiers each identifying one of a plurality of triangular faces of the at least one TIN, and
        for each respective cell of plural cells of a grid, associates the respective cell with each of the plurality of triangular faces that are at least partially overlapping with the respective cell, the plural cells of the grid being defined so as to cover the respective tile, and
    a processor coupled to the database and configured to determine a height coordinate of a map feature located on the three-dimensional surface based on lateral coordinates of the map feature, the processor further configured to use the index data to determine a triangular face of the at least one TIN on which the map feature is located in order to determine the height coordinate of the map feature.

2. The navigation system of claim 1, where the processor is further configured to:
    identify, based on the lateral coordinates, a cell of a tile in which the map feature is located; and
    determine, using the index data for the tile, a subset of triangular faces of the at least one TIN, which at least partially overlap with the determined cell.

3. The navigation system of claim 2, where the processor is further configured to:
    establish one triangular face of the subset on which the map feature is located; and
    compute the height coordinate of the map feature based on data defining the established triangular face.

4. The navigation system of claim 1, where, for at least one tile of the tiling, a size of the cells varies throughout the at least one tile.

5. The navigation system of claim 4, where, for all tiles of the tiling, the plural cells are respectively defined such that a number of triangular faces which overlaps with any one of the plural cells is limited by a pre-defined upper limit.

6. The navigation system of claim 1, further comprising an optical output unit, where the processor is coupled to the optical output unit and configured to control the optical output unit to output the map feature at a height corresponding to the determined height coordinate of the map feature.

7. A method of determining a height coordinate of a map feature based on lateral coordinates, the method comprising:
    using a database, the database storing, for a plurality of tiles of a tiling, index data for the respective tile and at least one triangulated irregular network (TIN) defining a three-dimensional surface, where the index data:
        includes a plurality of identifiers each identifying one of a plurality of triangular faces of the at least one TIN, and
        for each respective cell of plural cells of a grid, associates the respective cell with each of the plurality of triangular faces that are at least partially overlapping with the respective cell;
    accessing the index data to establish, based on the lateral coordinates, a triangular face of the at least one TIN on which the map feature is located; and
    determining the height coordinate based on the lateral coordinates and based on data defining the established triangular face.

8. The method of claim 7, where, in order to establish the triangular face, a cell of a tile in which the map feature is located is identified based on the lateral coordinates, and the identifiers stored for the cell in the index data are retrieved.

9. The method of claim 7, where, for at least one tile of the tiling, a size of the cells varies throughout the tile.

10. The method of claim 7, where an optical output unit is controlled to output the map feature at a height corresponding to the determined height coordinate.

11. The method of claim 7, where the database is generated by a map generation procedure which comprises the following steps respectively performed for the tile of the tiling:
    retrieving data defining the least one triangulated irregular network (TIN), the at least one TIN representing the three-dimensional surface;
    defining the grid as having a plurality of cells, the plurality of cells covering the tile;
    for each cell of the grid, determining triangular faces of the TIN which at least partially overlap with the respective cell; and
    storing index data for the tile and the data defining the at least one TIN in the database, the index data including, for each cell of the plurality of cells, information on all triangular faces of the TIN which at least partially overlap with the respective cell.

12. A method of generating a database for a navigation system, the method comprising the following steps performed for a tile of a tiling:
retrieving data defining at least one triangulated irregular network (TIN), the at least one TIN representing a three-dimensional surface;
defining a grid having a plurality of cells, the plurality of cells covering the tile;
for each cell of the grid, determining triangular faces of the TIN which at least partially overlap with the respective cell; and
storing index data for the tile and the data defining the at least one TIN in the database, wherein the index data allows a height coordinate of a map feature on the three-dimensional surface to be determined and includes a plurality of identifiers each identifying one of a plurality of triangular faces of the TIN, and for each respective cell of the grid, associates the respective cell with triangular faces of the TIN which at least partially overlap with the respective cell.

13. The method of claim 12, where the plurality of cells are defined such that a size of the cells varies throughout the grid.

14. The method of claim 13, where a size of the cells of the grid is selected locally such that a number of triangular faces of the TIN which at least partially overlap with a cell is limited by a pre-defined upper limit.

15. The method of claim 12, where a number of cells of the grid is selected based on a resolution level of the data defining the at least one TIN.

16. The method of claim 12, where the grid is defined such that each one of the cells is rectangular and sides of each cell are parallel to or overlap with sides of the tile.

17. The method of claim 12, where the database is stored in a storage device of the navigation system for use in terrain visualization.

18. A non-transitory computer readable storage medium having stored therein instructions executable by a programmed processor for determining a height coordinate of a map feature based on lateral coordinates using a database, the database storing for a plurality of tiles of a tiling index data for the respective tile and at least one triangulated irregular network (TIN), defining a three-dimensional surface, where the index data:
includes a plurality of identifiers each identifying one of a plurality of triangular faces of the at least one TIN, and
for each respective cell of plural cells of a grid, associates the respective cell with each of the plurality of triangular faces that are at least partially overlapping with the respective cell,
the storage medium comprising instructions for:
accessing the index data to establish, based on the lateral coordinates, a triangular face of the at least one TIN on which the map feature is located; and
determining the height coordinate based on the lateral coordinates and based on data defining the established triangular face.

19. The non-transitory computer readable storage medium of claim 18, where, in order to establish the triangular face, a cell of a tile in which the map feature is located is identified based on the lateral coordinates and the identifiers stored for the cell in the index data are retrieved.

20. The non-transitory computer readable storage medium of claim 18, where, for at least one tile of the tiling, a size of the cells varies throughout the tile.

21. The non-transitory computer readable storage medium of claim 18, where an optical output unit is controlled to output the map feature at a height corresponding to the determined height coordinate.

22. The non-transitory computer readable storage medium of claim 18, where the database is generated by a map generation procedure which comprises the following steps respectively performed for the tile of the tiling:
retrieving data defining the least one triangulated irregular network (TIN), the at least one TIN representing the three-dimensional surface;
defining the grid having a plurality of cells, the plurality of cells covering the tile;
for each cell of the grid, determining triangular faces of the TIN which at least partially overlap with the respective cell; and
storing index data for the tile and the data defining the at least one TIN in the database, the index data including, for each cell of the plurality of cells, information on all triangular faces of the TIN which at least partially overlap with the respective cell.

* * * * *